United States Patent Office 3,179,680
Patented Apr. 20, 1965

3,179,680
PURIFICATION OF ORGANIC ISOCYANATES
Ehrenfried H. Kober, Hamden, Conn., assignor to Olin Mathieson Chemical Corporation, a corporation of Virginia
No Drawing. Filed Oct. 31, 1962, Ser. No. 234,531
9 Claims. (Cl. 260—453)

The present invention relates to a new process for the purification of organic isocyanates and, more particularly, to a procedure for reducing the amount of hydrolyzable chloride contained in organic isocyanates.

Organic isocyanates are important intermediates in the manufacture of rubber and rubber-like materials, adhesive coating agents, insulating agents, and a wide variety of other synthetic plastic materials. Organic isocyanates are readily prepared from amines, corresponding to the isocyanates desired, either by direct phosgenation of the free amines, by phosgenation of the amine hydrochloride, or via the corresponding carbamyl chlorides in the presence of a suitable solvent. The crude reaction products thus obtained are usually treated at temperatures in the range of 100 to 180° C. with an inert gas such as nitrogen to remove unreacted phosgene and hydrogen chloride which is formed at the elevated temperature by dissociation of carbamyl chlorides into hydrogen chloride and the respective organic isocyanate. The degased product is then distilled to separate the solvent from the isocyanate. If desired, the isocyanate thus obtained can be distilled and fractionated for further purification.

In order to impart desirable properties to foams and other plastic materials prepared from isocyanates, the isocyanate has to contain a relatively small percentage of hydrolyzable chloride. If the hydrolyzable chloride content of an isocyanate is too low for any specific application, compounds such as benzoyl chloride can be added in order to increase the content of hydrolyzable chloride to the desired level. If the content of hydrolyzable chloride present in an isocyanate is too high for any specific application, the product must either be blended with material of very low hydrolyzable chloride content or be used for applications which do not require isocyanates of low hydrolyzable chloride content. In practice, the content of hydrolyzable chloride of the products obtained in the manufacture of organic isocyanates is sometimes undesirably high and, therefore, methods have been sought to reduce the content of hydrolyzable chloride in the isocyanate products. To achieve this objective, treatment of isocyanates with such compounds as ferric chloride, aluminum chloride, and other metal halides is disclosed in French Patent No. 1,284,256. These metal halides, however, are not only expensive, but also promote polymerization of isocyanates and, consequently, cause partial consumption of the isocyanate thus treated.

It is a primary object of the invention to overcome the disadvantages in the previously known processes for preparing organic isocyanates.

It is another object of the invention to provide a process for reducing the concentration of hydrolyzable chloride in organic isocyanates containing hydrolyzable chloride.

These and other objects of the invention will be apparent from the following detailed description.

It has now been discovered that the concentration of hydrolyzable chloride can be substantially reduced when water is admixed with an organic isocyanate containing hydrolyzable chloride at an elevated temperature. Reduction of the hydrolyzable chloride concentration in this manner is obtained without any significant reduction in the concentration of the organic isocyanate. This result is surprising and unexpected in view of the known ease of reaction between organic isocyanates and water to form ureas and polymeric materials.

The process of this invention may be employed in the treatment of various types of organic isocyanates containing hydrolyzable chloride. For example, crude organic isocyanate solutions which have been degased and separated from substantially all of the solvent, but which still contain resinous by-products and hydrolyzable chloride in a concentration usually between about 0.015 and about 1.0 percent or higher can readily be purified in accordance with the novel technique of this invention. In addition, concentrated crude solutions of organic isocyanate which contain approximately equal parts of isocyanate and resinous by-product formed by the distillation of a portion of the organic isocyanate from the crude organic isocyanate solution described above may also be purified. Also, the relatively pure isocyanate solution formed by the distillation of the above-mentioned crude organic isocyanate, or otherwise prepared, may be treated in accordance with the technique of this invention to reduce the concentration of any hydrolyzable chloride that may be contained therein.

Isocyanates which may be purified with water in accordance with the technique of this invention include the aromatic-mono- and poly-isocyanates as well as the aliphatic-mono- and poly-isocyanates and hydroaromatic mono- and poly-isocyanates. Typical examples of suitable organic isocyanates include hexylisocyanate, octylisocyanate, dodecylisocyanate, octadecylisocyanate, tetramethylene diisocyanate, pentamethylene diisocyanate, octamethylene diisocyanate, undecamethylene diisocyanate, dodecamethylene diisocyanate, 3,3'-diisocyanate dipropyl ether, cyclohexyl isocyanate, tetrahydro-α-naphthyl isocyanate, tetrahydro-β-naphthyl isocyanate, xylene diisocyanates, diphenylmethane 4,4'-diisocyanate, β,β-diphenylpropane 4,4'-diisocyanate, benzyl isocyanate, phenylethyl isocyanate, p-isocyanato benzyl isocyanate, phenyl isocyanate, p-cetyl phenyl isocyanate, p-dodecylphenyl isocyanate, 5-dodecyl-2-methylphenyl isocyanate, 3-nitro-4-dodecylphenyl isocyanate, p-cetyloxyphenyl isocyanate, metaphenylene diisocyanate, p-phenylene diisocyanate, naphthylene 1,4-diisocyanate, 2,4-tolylene diisocyanate, 2,6-tolylene diisocyanate, 1,3,5-benzene triisocyanate, tetrahydrofurfuryl isocyanate, and mixtures thereof.

The proportion of water necessary to effect hydrolysis of the hydrolyzable chloride is generally between about 0.1 and about 10 times the stoichiometric proportion of water necessary to hydrolyze all of the hydrolyzable chloride present in the organic isocyanate solution. It is preferred to use the smallest amount of water necessary to effect the desired reduction in hydrolyzable chloride concentration in order to avoid undesirable reaction between water and the isocyanate.

The temperature at which the water-treatment according to the present invention is carried out may range from about 20° C. and about 280° C., but is preferably in the range between about 150 and about 250° C. At temperatures above 180° C., the hydrogen chloride formed by hydrolysis of the compound responsible for the content of hydrolyzable chloride is usually removed by agitating the isocyanate product at the elevated temperature, whereas at temperatures below 180° C., purging with nitrogen or another inert gas is required to remove the hydrogen chloride formed. If desired, the water-treated isocyanate products can be subjected to distillation, which promotes further reduction of the content of hydrolyzable chloride, especially in cases where the water-treatment was performed at temperatures below 180° C.

The reaction period is generally between about 0.1 and about 3 hours, and preferably between about 0.5 and about 1.5 hours.

While I do not wish to be limited by theory (since the nature of the materials which are responsible for the hydrolyzable chloride content of the isocyanate compositions is not known precisely), it is believed that impurities containing the hydrolyzable chloride react with water more readily than the organic isocyanate to form hydrogen chloride as a reaction product. The hydrogen chloride is separated by any convenient technique. For example, as pointed out above, at elevated temperatures the hydrogen chloride escapes as a gas when the water-treated isocyanate product is agitated at an elevated temperature (for example above about 180° C.). However, at temperatures below 180° C. it is helpful to purge the mixture of water and organic isocyanate material with an inert gas such as nitrogen to remove the hydrogen chloride formed.

As pointed out previously, it is preferred to employ organic isocyanates containing a small proportion (between about 0.005 and about 0.03 percent by weight hydrolyzable chloride) in the preparation of polyurethane foams. Organic isocyanates of this type are easily prepared by the process of this invention.

The following examples are presented without any intention of being limited thereby. All parts and percentages are by weight unless otherwise specified.

*Example I*

One gram of water was added to 800 grams of distilled toluene diisocyanate having an assay of 99.7 percent of toluene diisocyanate and containing 0.033 percent of hydrolyzable chloride. A slow stream of nitrogen was passed to this mixture while it was heated from 22 to 250° C. over a period of one hour and stirred at 250° C. for an additional hour. There was no hydrolyzable chloride detectable in the toluene diisocyanate thus treated.

In contrast, treatment of a sample of the same toluene diisocyanate according to the procedure described above, but without addition of water, resulted in toluene diisocyanate having a hydrolyzable chloride content of 0.019 percent.

*Example II*

0.5 gram of water was added to 300 grams of distilled toluene diisocyanate having an assay of toluene diisocyanate of 99.7 percent and containing 0.036 percent of hydrolyzable chloride. The mixture was heated to 150° C. and keep at this temperature, with stirring, for one hour. The toluene diisocyanate thus treated was then distilled at 130° C./1 mm. Hg to afford toluene diisocyanate in which no hydrolyzable chloride could be detected.

*Example III*

A crude reaction mixture resulting from the phosgenation of toluene diamine in monochlorobenzene was degased at 130° C. with nitrogen; subsequently the solvent was removed by distillation. This gave a crude product containing 88.41 percent of toluene diisocyanate and 0.575 percent of hydrolyzable chloride. 0.5 gram of water was added to 150 grams of this product and the mixture was heated to 150° C. and stirred at this temperature for one hour while nitrogen was passed through. This procedure resulted in a product containing 0.112 percent of hydrolyzable chloride and, after distillation in vacuo, afforded toluene diisocyanate which contained 0.006 percent of hydrolyzable chloride.

The control experiment, in which a sample of crude toluene diisocyanate containing 0.575 percent of hydrolyzable chloride was stirred at 150° C. for one hour in the absence of water, resulted in a product containing 0.469 percent of hydrolyzable chloride before distillation and in toluene diisocyanate containing 0.021 percent of hydrolyzable chloride after distillation in vacuo.

*Example IV*

0.5 gram of water was added to 150 grams of crude toluene diisocyanate containing 88.41 percent of toluene diisocyanate and 0.575 percent of hydrolyzable chloride. The mixture was stirred at 190° C. for one hour, after which period of time the content of hydrolyzable chloride had been reduced to 0.104 percent. Subsequent distillation in vacuo resulted in toluene diisocyanate containing less than 0.001 percent of hydrolyzable chloride.

In contrast, treatment of the same crude toluene diisocyanate according to the procedure described above, but without addition of water, resulted—after distillation in vacuo—in toluene diisocyanate containing 0.013 percent of hydrolyzable chloride.

*Example V*

A crude reaction mixture, resulting from the phosgenation of toluene diamine in monochlorobenzene was degased at 130° C. with nitrogen; subsequently, the solvent and a considerable part of the toluene diisocyanate were removed by distillation in vacuo. The resulting distillation bottom contained 50.42 percent of toluene diisocyanate and 0.631 percent of hydrolyzable chloride. 0.5 gram of water was added to 150 grams of the distillation bottom. The mixture was then heated to 150° C. and kept at this temperature for one hour while nitrogen was passed through. This resulted in a product containing 0.243 percent of hydrolyzable chloride. Subsequent distillation in vacuo gave toluene diisocyanate which contained 0.025 percent of hydrolyzable chloride.

In contrast, heating of the distillation bottom containing 0.631 percent of hydroyzable chloride at 150° C. for one hour increased the content of hydrolyzable chloride to 0.817 percent. Subsequent distillation in vacuo afforded toluene diisocyanate containing 0.058 percent of hydrolyzable chloride.

*Example VI*

0.5 gram of water was added to 150 grams of the bottom containing 0.631 percent of hydrolyzable chloride and 50.42 percent toluene diisocyanate, obtained as described in Example V. This mixture was heated to 220° C. and stirred at between 220 to 240° C. for one hour. This procedure resulted in a product containing 0.015 percent of hydrolyzable chloride. Subsequent distillation in vacuo afforded toluene diisocyanate containing 0.001 percent of hydrolyzable chloride.

In a control experiment, the bottom containing 0.631 percent of hydrolyzable chloride was stirred at 220–240° C. for one hour, while nitrogen was passed through. No water had been added. This resulted in a product containing 0.063 percent of hydrolyzable chloride and—after distillation in vacuo—in toluene diisocyanate containing 0.017 percent of hydrolyzable chloride.

Various modifications of the invention, some of which have been referred to above, may be employed without departing from the spirit of this invention. Therefore I do not wish to be limited except as defined by the following claims.

I claim:

1. The process for reducing the concentration of hydrolyzable chloride in an organic isocyanate containing hydrolyzable chloride, said organic isocyanate being selected from the group consisting of aromatic isocyanates and aliphatic isocyanates, which comprises admixing said organic isocyanate with water to effect hydrolysis of chloride contained therein, and removing hydrogen chloride as it is formed from the resulting mixture.

2. The process of claim 1 wherein the proportion of water is equivalent between about 0.1 and about 10 times the stoichiometric proportion necessary to effect complete hydrolysis of all of the hydrolyzable chloride contained in said organic isocyanates.

3. The process of claim 1 wherein said organic isocyanate is admixed with said water at an elevated temperature.

4. The process of claim 3 wherein said temperature is between about 150 and about 250° C.

5. The process of claim 1 wherein said organic isocyanate is toluene diisocyanate.

6. The process for reducing the hydrolyzable chloride concentration in an organic isocyanate containing hydrolyzable chloride, said organic isocyanate being selected from the group consisting of aromatic isocyanates and aliphatic isocyanates, which comprises admixing said organic isocyanate with water in a proportion equivalent to between about 0.1 and about 10 times the stoichiometric proportion of water necessary to hydrolyze all of the hydrolyzable chloride contained therein, the resulting mixture being maintained at a temperature between about 20 and about 280° C. for a period of between about 0.1 and about 3 hours, and removing hydrogen chloride as it is formed from the resulting mixture.

7. The process of claim 6 wherein said organic isocyanate is toluene diisocyanate.

8. The process for reducing the hydrolyzable chloride concentration in an organic isocyanate containing hydrolyzable chloride, said organic isocyanate being selected from the group consisting of aromatic isocyanates and aliphatic isocyanates, which comprises admixing said organic isocyanate with water in a proportion equivalent to between about 1.0 and about 9 times the stoichiometric proportion of water necessary to hydrolyze all of the hydrolyzable chloride contained therein, the resulting mixture being maintained at a temperature between about 150 and about 250° C. for a period of between about 0.5 and 1.5 hours, and removing hydrogen chloride as it is formed from the resulting mixture.

9. The process of claim 8 wherein said organic isocyanate is toluene diisocyanate.

References Cited by the Examiner
UNITED STATES PATENTS 2,620,349 12/52 Slocombe _____ 260—453
2,808,371 10/57 Stevens _____ 260—463

CHARLES B. PARKER, *Primary Examiner.*